US012474679B2

(12) United States Patent
Park

(10) Patent No.: US 12,474,679 B2
(45) Date of Patent: Nov. 18, 2025

(54) SYNTAX TRANSLATION FROM FIRST SYNTAX TO SECOND SYNTAX BASED ON STRING ANALYSIS

(71) Applicant: Tyco Fire & Security GmbH, Neuhausen am Rheinfall (CH)

(72) Inventor: Youngchoon Park, Brookfield, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 166 days.

(21) Appl. No.: 18/213,748

(22) Filed: Jun. 23, 2023

(65) Prior Publication Data

US 2023/0333519 A1 Oct. 19, 2023

Related U.S. Application Data

(63) Continuation of application No. 17/087,441, filed on Nov. 2, 2020, now Pat. No. 11,754,982, which is a (Continued)

(51) Int. Cl.
G05B 13/02 (2006.01)
G05B 15/02 (2006.01)
G06N 7/01 (2023.01)

(52) U.S. Cl.
CPC ......... *G05B 13/0265* (2013.01); *G05B 15/02* (2013.01); *G06N 7/01* (2023.01); (Continued)

(58) Field of Classification Search
CPC .............. G05B 15/02; G05B 13/0265; G05B 2219/21088; G05B 2219/25011; G06N 7/01
(Continued)

(56) References Cited

U.S. PATENT DOCUMENTS 5,301,109 A 4/1994 Landauer et al.
5,446,677 A 8/1995 Jensen et al.
(Continued)

FOREIGN PATENT DOCUMENTS

AU 2019226217 A1 11/2020
AU 2019226264 A1 11/2020
(Continued)

OTHER PUBLICATIONS

U.S. Appl. No. 17/567,275, filed Feb. 9, 2022, Harvey et al.
(Continued)

*Primary Examiner* — Ronald D Hartman, Jr.
(74) *Attorney, Agent, or Firm* — Foley & Lardner LLP

(57) ABSTRACT

A computerized method of assigning a building automation system point type to a plurality of unclassified data points is provided. The method includes receiving unclassified data points and attributes for each data point. The method includes receiving classifications for a first subset of the unclassified data points. Each classification associates a data point with a building automation system point type. The method includes generating a term set containing substrings that appear in the attributes. The method includes generating a first matrix describing a frequency that the substrings appear in the attributes. The method includes calculating an indicator of a probability that the presence of the selected substring results in the data point belonging to the selected point type. The method includes assigning a point type to a second subset by finding the substring and potential point type pair having the greatest indication of probability.

20 Claims, 5 Drawing Sheets

Related U.S. Application Data continuation of application No. 16/722,439, filed on Dec. 20, 2019, now Pat. No. 10,831,163, which is a continuation of application No. 15/207,376, filed on Jul. 11, 2016, now Pat. No. 10,859,984, which is a continuation of application No. 13/595,945, filed on Aug. 27, 2012, now Pat. No. 9,411,327.

(52) U.S. Cl.
CPC ............... *G05B 2219/21088* (2013.01); *G05B 2219/25011* (2013.01)

(58) Field of Classification Search
USPC .......................................................... 700/275
See application file for complete search history.

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,240,326 B1 | 5/2001 | Gloudeman et al. |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,280,723 B1 | 10/2012 | Laaser |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,411,327 B2 | 8/2016 | Park |
| 9,447,985 B2 | 9/2016 | Johnson |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,767,409 B1 | 9/2017 | Makhijani et al. |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,417,451 B2 | 9/2019 | Park et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,871,756 B2 | 12/2020 | Johnson et al. |
| 10,908,578 B2 | 2/2021 | Johnson et al. |
| 10,921,760 B2 | 2/2021 | Harvey |
| 10,921,768 B2 | 2/2021 | Johnson et al. |
| 10,921,972 B2 | 2/2021 | Park et al. |
| 10,969,133 B2 | 4/2021 | Harvey |
| 10,976,068 B2 | 4/2021 | Hallendy et al. |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,156,978 B2 | 10/2021 | Johnson et al. |
| 11,229,138 B1 | 1/2022 | Harvey et al. |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |

(56) References Cited

U.S. PATENT DOCUMENTS

| | | |
|---|---|---|
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0074640 A1* | 4/2003 | Mandell .................. G06F 30/33 716/103 |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0021679 A1 | 2/2004 | Chapman et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0062468 A1* | 3/2006 | Xu ...................... G06V 30/1423 382/186 |
| 2006/0095521 A1 | 5/2006 | Patinkin |
| 2006/0140207 A1 | 6/2006 | Eschbach et al. |
| 2006/0167667 A1* | 7/2006 | Maturana ......... G05B 19/41885 703/6 |
| 2006/0184479 A1 | 8/2006 | Levine |
| 2006/0200476 A1 | 9/2006 | Gottumukkala et al. |
| 2006/0248523 A1 | 11/2006 | Berg et al. |
| 2006/0253205 A1 | 11/2006 | Gardiner |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0067062 A1 | 3/2007 | Mairs et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2008/0282198 A1 | 11/2008 | Brooks et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0287130 A1 | 11/2010 | Guralnik et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2012/0284377 A1* | 11/2012 | Von Stein ............ G05B 19/042 709/221 |
| 2012/0296451 A1 | 11/2012 | Kaps et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0173062 A1 | 7/2013 | Koenig-Richardson |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0249797 A1* | 9/2014 | Liu ...................... G06F 40/194 704/2 |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |

(56) References Cited

U.S. PATENT DOCUMENTS

| | | |
|---|---|---|
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0320758 A1 | 11/2016 | Park |
| 2016/0330082 A1* | 11/2016 | Bliss .................. G06F 3/04842 |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0249327 A1 | 8/2017 | Gowdappa et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0129714 A1 | 5/2018 | Saxena et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0197113 A1 | 6/2019 | Iyengar |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |

(56) References Cited

U.S. PATENT DOCUMENTS

| | | | |
|---|---|---|---|
| 2023/0071312 A1 | 3/2023 | Preciado et al. | |
| 2023/0076011 A1 | 3/2023 | Preciado et al. | |
| 2023/0083703 A1 | 3/2023 | Meiners | |

FOREIGN PATENT DOCUMENTS

| | | | | |
|---|---|---|---|---|
| CA | 2957726 | A1 | 3/2016 | |
| CA | 3043996 | A1 | 2/2018 | |
| CN | 101415011 | A | 4/2009 | |
| CN | 102136099 | A | 7/2011 | |
| CN | 102136100 | A | 7/2011 | |
| CN | 102650876 | A | 8/2012 | |
| CN | 104040583 | A | 9/2014 | |
| CN | 104603832 | A | 5/2015 | |
| CN | 104919484 | A | 9/2015 | |
| CN | 106204392 | A | 12/2016 | |
| CN | 106406806 | A | 2/2017 | |
| CN | 106960269 | A | 7/2017 | |
| CN | 107147639 | A1 | 9/2017 | |
| CN | 107598928 | A | 1/2018 | |
| CN | 104793567 | B | * 1/2019 | ......... G05B 19/4097 |
| EP | 2 528 033 | A1 | 11/2012 | |
| EP | 3 186 687 | A4 | 7/2017 | |
| EP | 3 268 821 | B1 | 1/2018 | |
| EP | 3 324 306 | A1 | 5/2018 | |
| EP | 3 497 377 | A1 | 6/2019 | |
| EP | 4 226 263 | A1 | 8/2023 | |
| JP | H749788 | A | 2/1995 | |
| JP | H0749788 | A | * 2/1995 | |
| JP | H10-049552 | A | 2/1998 | |
| JP | 2003-162573 | A | 6/2003 | |
| JP | 2007-018322 | A | 1/2007 | |
| JP | 4073946 | B1 | 4/2008 | |
| JP | 2008-107930 | A | 5/2008 | |
| JP | 2013-152618 | A | 8/2013 | |
| JP | 2014-044457 | A | 3/2014 | |
| KR | 2016/0102923 | A | 8/2016 | |
| WO | WO-2009/020158 | A1 | 2/2009 | |
| WO | WO-2011/100255 | A2 | 8/2011 | |
| WO | WO-2012/110089 | A1 | 8/2012 | |
| WO | WO-2013/050333 | A1 | 4/2013 | |
| WO | WO-2015/106702 | A1 | 7/2015 | |
| WO | WO-2015/145648 | A1 | 10/2015 | |
| WO | WO-2017/035536 | A1 | 3/2017 | |
| WO | WO-2017/192422 | A1 | 11/2017 | |
| WO | WO-2017/194244 | A1 | 11/2017 | |
| WO | WO-2017/205330 | A1 | 11/2017 | |
| WO | WO-2017/213918 | A1 | 12/2017 | |
| WO | WO-2018/132112 | A1 | 7/2018 | |
| WO | WO-2020/061621 | A1 | 4/2020 | |
| WO | WO-2022/042925 | A1 | 3/2022 | |
| WO | WO-2022/103812 | A1 | 5/2022 | |
| WO | WO-2022/103813 | A1 | 5/2022 | |
| WO | WO-2022/103820 | A1 | 5/2022 | |
| WO | WO-2022/103822 | A1 | 5/2022 | |
| WO | WO-2022/103824 | A1 | 5/2022 | |
| WO | WO-2022/103829 | A1 | 5/2022 | |
| WO | WO-2022/103831 | A1 | 5/2022 | |

OTHER PUBLICATIONS

U.S. Appl. No. 17/722,115, Passivelogic, Inc.
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick A uniform metadata schema for buildings, 7 pages, dated Oct. 22, 2019, Brickschema.org.
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. Ser. No. 201780003995.9 dated Apr. 8, 2021 (21 pages with English language translation).
Chinese Office action on CN Appl. Ser. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).

(56) References Cited

OTHER PUBLICATIONS

Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. Ser. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Koh, et al., Poster: Scrabble: Converting Unstructured Metadata into Brick for Many Buildings, 2 pages, Dated Nov. 8-9, 2017.
Koh, et al., Scrabble: Converting Unstructured Metadata into Brick for Many Buildings, UCSanDiego, 2017, 1 page.
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages with English language abstract).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).
CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-

(56) References Cited

OTHER PUBLICATIONS

Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

* cited by examiner

SYNTAX TRANSLATION FROM FIRST SYNTAX TO SECOND SYNTAX BASED ON STRING ANALYSIS

CROSS-REFERENCE TO RELATED PATENT APPLICATIONS

This application is a continuation of U.S. patent application Ser. No. 17/087,441 filed Nov. 2, 2020, which is a continuation of U.S. patent application Ser. No. 16/722,439 filed Dec. 20, 2019 (now U.S. Pat. No. 10,831,163) which is a continuation of U.S. patent application Ser. No. 15/207,376, filed Jul. 11, 2016 (now U.S. Pat. No. 10,859,984) which is a continuation of U.S. patent application Ser. No. 13/595,945, filed Aug. 27, 2012 (now U.S. Pat. No. 9,411,327). The entirety of each of these patent applications are incorporated by reference herein.

BACKGROUND

The present disclosure generally relates to the field of building automation systems. The present invention more particularly relates to systems and methods for classifying data points within a multi-point network based on processing the non-standard and semantically rich descriptions of the points.

Advanced building management system applications sometimes rely on the classification and identification of points. Conventional building management system commissioning processes rely heavily on manual point classification methods. In other words, a user manually evaluates an existing point and manually classifies the point under the schema or protocol for the new application.

Building automation systems are, in general, hardware and/or software systems configured to control, monitor, and manage devices in or around a building or building area. BAS subsystems or devices can include heating, ventilation, and air conditioning (HVAC) subsystems or devices, security subsystems or devices, lighting subsystems or devices, fire alerting subsystems or devices, elevator subsystems or devices, or other devices that are capable of automating or managing building functions, or any combination thereof.

Building automation communication standards such as BACnet and oBIX provide mechanisms to uniquely identify a data item or point within a domain of interest (e.g., within a system or a controller). The standards also allow description of the function of a data point. However, the standards are designed for human operators, not for machine processing. The human operators often decide upon a naming convention that roughly describes the location, type, or other attributes of the point. For example, a human operator might decide to name a power meter located at building C1, Floor 3, East as "BLDG-C1/ZONE/F-3/EAST/UTILS/EMETER/PWR-3," where forward slash is used as a delimiter. Despite good intentions, point names are often non-standard and difficult to parse. If the goal is assigning a discovered point to a rich functional description that an application can understand and process, the commissioning process can be very lengthy for buildings having many points. For example, given 50,000 discovered points and a conservatively quick one minute per point to review, classify, and commission, over eight hundred hours of manual investigation may be necessary to configure building points such that they will be useful to an application that relies on accurate functional classification and mapping. Because not all points are necessary for an application, points that are relevant to an application must be selected. This is also accomplished through manual investigation of naming conventions, when such conventions exist. Relevant points must be mapped into the specific equipment. For example, HVAC equipment generally comprises a set of points. Temperature sensors, cooling/heating set points, humidity, discharge air temperature, and other points, for example, may be associated with a single variable air volume (VAV) box. Conventionally, spatial relationships among points, equipments and building spaces must be manually identified and mapped.

Current building automation system naming standards lack the expressive power to (1) assign a computable semantic type description to a specific point, and (2) create a relationship among building related objects (e.g., temperature sensor, fan speed, electricity consumption, zone, equipment, etc.). Even though BACnet provides an object identifier, an object name, and an object type as mandatory attributes (e.g., character strings) to describe a point, there is no extension to describe the function of the point as an object type and to define relationships among multiple BACnet objects. Human interpretation of attributes is required to identify the function of the point for further programming or application binding. Often additional programming and nonstandard metadata management are used to support new building automation system applications.

The challenges already discussed are increased by the reality that enterprise class building automation systems are often the collection of heterogeneous building automation subsystems and devices. Furthermore, over time different building engineers may add-to or otherwise modify the system. For example, to describe outdoor air temperature, one operator may use "OAT," while another uses "Outdoor Temperature." It is also possible for multiple languages (e.g., English and Spanish) to variously be used in naming and describing a single system configuration. The uniqueness of each language makes word extraction or word segmentation extremely challenging. For example, Chinese and Japanese do not have white space to delimit characters at word boundaries. Many European languages, e.g., German, permit free form word jointing to make compound words. There are many abbreviations to shorten the description of points, and there are many variations for each abbreviation. For example, to describe zone temperature, "ZT," "ZN-T," "ZNT," and others may be used. An organization may use custom coding technology to encode data points. Such systems may be lookup based, such that a point is assigned a unique identifier, e.g., 01V001AI01.

For at least the reasons noted above, it is challenging and difficult to develop systems and methods for classifying data in building automation systems.

SUMMARY

One embodiment of the invention relates to a computerized method of assigning a building automation system point type to a plurality of unclassified data points of a building automation system. The method includes receiving, at a processing circuit, the plurality of unclassified data points and at least one attribute for each data point. The method includes receiving classifications for a first subset of the unclassified data points. Each classification associates a data point with a building automation system point type. The remaining unclassified data points form a second subset. The method includes generating a term set containing substrings that appear in the attributes of the first subset of data points. The method includes generating a first matrix describing a frequency that each of the substrings appears in the at least one attribute of the data points of the first subset. The method includes, for each of a plurality of potential building automation system point types and for each of a plurality of different substrings, calculating an indicator of a probability that the presence of the selected substring in the at least one attribute of a data point results in the data point belonging to the selected building automation system point type. The method includes assigning a building automation system point type to each data point of the second subset by finding the substring and potential building automation system point type pair having the greatest indication of probability.

Another embodiment of the invention relates to a system for assigning a building automation system point type to a plurality of unclassified data points of a building automation system. The system includes a processing circuit configured to receive the plurality of unclassified data points and at least one attribute for each data point. The processing circuit is further configured to receive classifications for a first subset of the unclassified data points. Each classification associates a data point with a building automation system point type. The remaining unclassified data points form a second subset. The processing circuit is further configured to generate a term set containing substrings that appear in the attributes of the first subset of data points. The processing circuit is further configured to generate a first matrix describing a frequency that each of the substrings appears in the at least one attribute of the data points of the first subset. The processing circuit is further configured, for each of a plurality of potential building automation system point types and for each of a plurality of different substrings, to calculate an indicator of a probability that the presence of the selected substring in the at least one attribute of a data point results in the data point belonging to the selected building automation system point type. The processing circuit is further configured to assign a building automation system point type to each data point of the second subset by finding the substring and potential building automation system point type pair having the greatest indication of probability.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the Figures, a computer system for automatically classifying data points in a building automation system (BMS) is shown and described. The computer system may be utilized in conjunction with a plurality of building automation or management systems, subsystems, or as a part high level building automation system. For example, the computer system may be a part of a Johnson Controls METASYS building automation system.

The computer system includes a processing circuit configured to probabilistically classify points through frequency weighting of relevant terms used in point descriptions. The processing circuit is also configured to provide a graphical user interface for allowing a building operator to view, sort, and/or edit point descriptions and BMS point types.

Embodiments of the present disclosure are configured to automatically (e.g., via a computerized process) calculate the frequency that relevant terms appear in point descriptions belonging to the same BMS point type. The frequencies may be weighted, e.g., to account for the appearance of common descriptors (e.g., "Metasys") across all or substantially all data points. A matrix describing the frequencies can be generated. The matrix may be generated using a subset (e.g., training data) of the full dataset to be classified. From the frequency matrix, a representation of the probability that the presence of a substring in a point description attribute indicates that the point belongs to a given point type may be generated. A naive Bayes classifier, latent semantic indexing, or other classification methods, can be used to assign point types to data points in the entire dataset.

One or more embodiments described herein advantageously assign BMS point types to data points with names or descriptions that include a large number of abbreviations, non-dictionary words, and incomplete sentences. One or more embodiments also advantageously assign point types without general word-breaking rules and/or lexical analysis algorithms. One or more of the embodiments also advantageously avoid the need for new or different word-breaking rules and/or lexical analysis algorithms when additional data points (e.g., additional BAS installations or subsystems) are added to the system. One or more of the embodiments also advantageously assign point types based on terms in the point descriptions without a complete keyword dictionary or a parser that must be updated each time new data points are added to the system.

Figure 1:
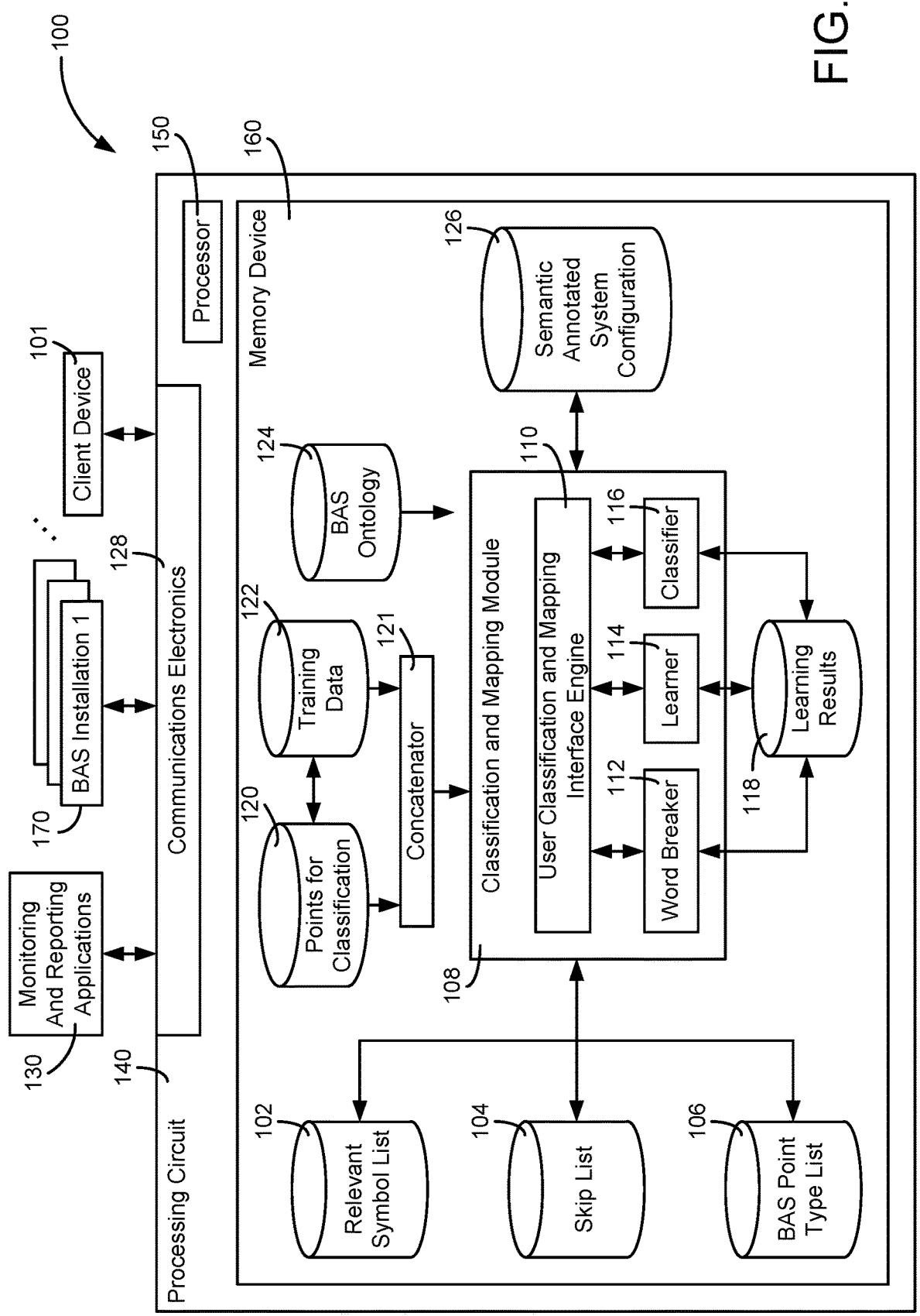
FIG. 1 is a block diagram of a system for classifying data points in a building management system, according to an exemplary embodiment.

Referring now to FIG. 1, a block diagram of system 100 for classifying data points in a building automation system is shown, according to an exemplary embodiment. System 100 includes a processing circuit 140. Processing circuit 140 may be configured to carry out process 400 (FIG. 4), process 500 (FIG. 5), process 600 (FIG. 6), process 700 (FIG. 7), or other processes described herein.

System 100 also includes BAS installations 170. BAS installations 170 are, in general, hardware and/or software systems configured to control, monitor, and manage devices in or around a building or building area. Subsystems or devices of BAS installations 170 can include heating, ventilation, and air conditioning (HVAC) subsystems or devices, security subsystems or devices, lighting subsystems or devices, fire alerting subsystems or devices, elevator subsystems or devices, other devices that are capable of managing building functions, or any combination thereof. Many data points may be associated with each subsystem and device of BAS installations 170. For example, a return air temperature data point may be associated with a HVAC subsystem's return air temperature sensor. Data points are named or otherwise described with attributes or metadata in BAS installations 170. A point description may include, e.g., an object identifier, object name, description, device type, units, or other attributes. BAS installations 170 may have many of a particular point type. For example, in a building with more than one floor, many temperatures sensors may exist per floor.

Processing circuit 140 is configured to include communications electronics 128. Communications electronics 128 may be a network interface, and processing circuit 140 may be configured to communicate with BAS installations 170 via a network connection provided by communications electronics 128. For example, point descriptions from BAS installations 170 may be received at processing circuit 140 via communications electronics 128. Communications electronics 128 may be used to communicate with monitoring and reporting applications 130 and/or with client device 101. For example, point descriptions and BMS point types may be provided to and edited point descriptions and BMS points types may be received from monitoring and reporting applications 130 and/or client device 101 via communications electronics 128. Communications electronics 128 can be or include wired or wireless interfaces (e.g., jacks, antennas, transmitters, receivers, transceivers, wire terminals, etc.) for conducting data communications with another system or network. For example, communications electronics 128 can include an Ethernet card and port for sending and receiving data via an Ethernet-based communications network. In another example, communications electronics 128 includes a WiFi transceiver for communicating via a wireless communications network. Communications electronics 128 may be configured to communicate via local area networks or wide area networks (e.g., the Internet, a building WAN, etc.).

According to an exemplary embodiment, processing circuit 140 is integrated within a single computer (e.g., one server, one housing, etc.). In various other exemplary embodiments, processing circuit 140 can be distributed across multiple servers or computers (e.g., that can exist in distributed locations). In another exemplary embodiment, processing circuit 140 may integrated with a smart building manager that manages multiple building systems. In other embodiments, processing circuit 140 may exist relatively independently of other building automation system. Processing circuit 140 may be configured to receive and operate on data received from one or more building automation system installations 170. The installations 170 themselves may be remote from one another and remote from processing circuit 140.

Processing circuit 140 includes processor 150 and memory 160. Processor 150 can be implemented as a general purpose processor, an application specific integrated circuit (ASIC), one or more field programmable gate arrays (FPGAs), a group of processing components, or other suitable electronic processing components. Memory 160 is one or more devices (e.g., RAM, ROM, Flash memory, hard disk storage, etc.) for storing data and/or computer code for completing and/or facilitating the various processes and modules described in the present disclosure. Memory 160 may be or include volatile memory or non-volatile memory. Memory 160 may include database components, object code components, script components, or any other type of information structure for supporting the various activities and information structures described in the present disclosure. According to an exemplary embodiment, memory 160 is communicably connected to processor 150 via processing circuit 140 and includes computer code for executing (e.g., by processing circuit 140 and/or processor 150) one or more processes described herein.

Memory 160 is shown to include one exemplary embodiment of the system architecture for the point commissioning process described herein. Memory 160 is shown to include points for classification 120. Points for classification 120 include point objects and/or point descriptors received from BAS installations 170.

Point objects are collections of attribute values. In the discussion herein, "data point," "point," and "point object" are used interchangeably. In a dataset, the ith point $p_i$ is a set of attribute values $a_{(i,j)}$, denoted by $p_i\{a_{(i,j)}, \ldots, a_{(i,n)}\}$. $a_{(i,j)}$ represents the jth attribute of the ith point in a dataset. For example, a set of attributes for a BACnet analog object may include object identifier, object name, description, device type, or other attributes. A BACnet point for a return air temperature sensor, e.g., may have the following attributes (shown with example values for illustrative purposes):

| Attribute Type | Value |
| --- | --- |
| Object Identifier | Analog Input #1101 |
| Object Name | 507_SP2.RET_AIR |
| Object Type | Analog Input |
| Present Value | 68 |
| Description | Return Air Temperature |
| Device Type | Thermistor |
| Status Flags | In_Alarm, Fault |
| Units | DOF |
| . | . |
| . | . |
| . | . |

For further processing by processing circuit 100, concatenator 121 can create a point descriptor for each point to be classified. The resulting point descriptor is an n-gram (i.e., a continuous sequence of the attributes) in the form of a concatenated string of the attribute values of the point. The point descriptor $d_i$ of the ith point object $p_i$, with attributes $a_{(i,j)}$, is defined as:

$$d_i = str(a_{(i,j)}) \cdot @ \cdot str(a_{(i,2)}) \cdot @ \cdot, \ldots, \cdot @ \cdot str(a_{(i,n)})$$

where · denotes a string concatenation operator and str is a function that converts an attribute $a_{(i,j)}$ to a string. The symbol @ represents a delimiter inserted for ease of parsing in word breaking. For example, a point descriptor for the set of attributes described in the table above is:
"Analog Input #1101@507_5P2.RET_AIR@Analog Input@Return Air Temperature@Thermistor@DOF"

Concatenator 121 may omit and/or modify certain attribute values during the concatenation process. According to an exemplary embodiment, attributes values that are solely numeric are omitted from the point descriptor by the concatenator 121. Thus, in the example above, the point descriptor did not include the attribute value "68," corresponding to the present value of the return air temperature. Omitting numeric values may advantageously reduce the data that classification and mapping module 108 parses in order to extract relevant substrings, words, symbols, or terms.

Some attributes have an abbreviation and an index (e.g., SP-2 or ZN_T-2). The index may be a numeric quantity. According to an exemplary embodiment, indices are replaced by a predefined character when the attribute value is included in a point descriptor (e.g., SP-2 becomes SP-? and ZN_T-1 becomes ZN_T-?). Modifying attributes with indices may advantageously enable classification and mapping module 108 to identify relevant patterns of substrings, words, symbols, or terms. For example, ZN_T-1 (which may stand for zone temperature sensor 1) may appear only once in a dataset (e.g., for the first zone of a building), but ZN_T-? may appear many times (e.g., for each zone temperature sensor). According to another exemplary embodiment, edit distance (i.e., character position in a substring) may be used in string similarity measurement and exclusion decisions.

A subset of points for classification 120 (i.e., a first subset) may be designated as training data 122. According to an exemplary embodiment, point descriptors of training data 122 are manually assigned BMS point types via a user interface presented on a display screen (e.g., on a display of client device 101). The resulting training data 122 may be used by classification and mapping module 108 to generate or help populate an initial relevant symbol list 102, a skip list 104, and/or a BAS point type list 106. In various embodiments, all or some portion of the labeled point descriptors of training data 122 are used to generate relevant symbol list 102, skip list 104, and/or BAS point type list 106.

Training data 122 may also be used to train a naive Bayes classifier used to classify points as BMS point types. In some embodiments, the same set of training data 122 is used to generate relevant symbol list 102 and to train the classifier 116. In other embodiments, different and/or overlapping sets of training data are used. In some embodiments, training data 122 is manually chosen by a BAS operator. In other embodiments, training data 122 is automatically (e.g., randomly, pseudo-randomly, etc.) chosen by classification and mapping module 108. In other words, classification and mapping module 108 may be configured to select a representative portion of points for classification 120 for training. A representative portion may include equal or nearly equal numbers of point objects or point descriptors from a given point type and/or BAS installation. In an exemplary embodiment, classification and mapping module 108 may select training data 122 as a set of training samples $X=\{x_i \in c_j | 0 \le i \le M, 0 \le j \le K\}$, where a training sample $\langle x_i, c_j \rangle$ comprises of a feature vector (i.e., point descriptor or concatenated string of point descriptors) $x_i$ and a manually assigned point type, $c_j$. M denotes the number of training samples in X. K denotes the number of target classes in the training set.

Memory 160 includes BAS point type list 106. BAS point type list 106 is a collection of point types to which a point may be assigned. For example, a BAS point type list may include:

| Point Types |
|---|
| Box Heating Output |
| Utility Interval Consumption |
| Zone Temperature Setpoint |
| Zone Temperature |
| Supply Flow Setpoint |
| Supply Flow |
| Supply Fan Status |
| Supply Fan Output |
| Return Air Temperature |

| Point Types |
|---|
| Occupancy |
| Min Outdoor Air Damper Output |
| Interval Demand |
| Interval Consumption |
| Heating Output |
| Effective Housing Setpoint |
| Effective Cooling Setpoint |
| Duct Static Pressure Setpoint |
| Discharge Air Temperature Setpoint |
| Discharge Air Temperature |
| Damper Position |
| Cooling Output |
| Cooling MaxFlow |
| . |
| . |
| . |

In some embodiments, BAS point type list 106 is automatically generated using the manually-labeled points of training data 122. In other embodiments, the point types are standardized types supported by a class of monitoring and reporting applications 130, by an application on client device 101, or by applications of one or more devices. In yet other embodiments, point type list 106 is based on a standard list plus manual edits. In such an embodiment, for example, a BAS operator might manually add, remove, or otherwise modify point types.

BAS ontology 124 is an information system for relating building automation system concepts and objects in a way to facilitates advanced processing tasks. BAS ontology 124 may rely upon the proper classification of points. Implementation details of indexing, retrieval, and querying of ontology is discussed in U.S. patent application Ser. No. 12/831,866, filed Jul. 7, 2010, which is hereby incorporated by reference in its entirety.

Memory 160 includes classification and mapping module 108. Module 108 may probabilistically determine BMS point types for data points using frequency-weighted point descriptor terms. Classification and mapping module 110 may be computer code executable by processor 150. In an exemplary embodiment, classification and mapping module 110 calculates the frequency of relevant terms in concatenated point descriptions (. Classification and mapping module 110 also generates a indicator of the probability that the appearance of one or more substrings in a point description means that the corresponding point belong to a particular BMS point type. The substrings may be found in attributes associated with the points of the building management system.

Classification and mapping module 108 is shown to include word breaker 112. Word breaker 112 may generate a list of substrings, which are likely to indicate that a particular point belongs to a particular point type.

Classification and mapping module 108 is further shown to include learner 114. Learner 114 may generate a matrix of the frequency with which substrings generated by word breaker 112 appear in points for classification 120.

Classifier 116 assigns BMS point types to points of points for classification 120 when a point maximizes the probability that one or more substrings in a point descriptor indicate that the point belongs to the particular point type. GUI services 110 provides a user interface for a BAS operator to manually assign point types to points of training data 122, generate and/or update relevant symbol list 102, generate a frequency matrix, assign and/or update assigned point types, etc. Module 108 may receive inputs from points for classification 120, training data 122, and BAS ontology 124. Module 108 may also receive and transmit data to relevant symbol list 102, skip list 104, learning results 118, and annotated system configuration 126.

Classification and mapping module 108 includes GUI services 110. Data and processing results from classification and mapping module 108, points for classification 120, training data 122, relevant symbol list 102, skip list 104, BAS point type list 106, annotated system configuration 126, etc., may be accessed by or may be pushed to a monitoring application 130 with several graphical user interface (GUI) elements (e.g., widgets, dashboard controls, windows, etc.). According to an exemplary embodiment, a user (e.g., a BAS operator) may use web-based monitoring applications 130 to view and navigate real time dashboards relating to the classification of points described herein. The GUI elements may list and/or summarize points for classification 120 and/or training data 122. A user may utilize GUI services 110 to manually assign BMS point types to points of training data 122. The GUI elements may also allow a BAS operator to start, modify, or end the processes for automatic generation of relevant symbol list 102, skip list 104, and/or BAS point type list 106. A user may utilize GUI services 110 to manually add, remove, or modify terms or point types from lists 102, 104, 106. The GUI elements may also allow a user to view the results of the frequency calculations and probability calculations by learner 114. A user may utilize GUI services 110 to view and/or modify the assigned point types and data points from classifier 116 and/or annotated system configuration 126.

According to an exemplary embodiment, the GUI elements may also allow a user to map spatial relationships among points, equipment, and building spaces. For example, a user may assign location (e.g., building A, first floor, zone 1) to a zone temperature sensor associated with a zone temperature point. In some embodiment, the a list of automatically discovered points from BAS installations 170 is shown. In some embodiments, the automatically generated relevant symbol list 102, skip list 104, BAS point type list 104 are displayed a user. According to an exemplary embodiment, GUI elements may include a drag-and-drop interface. The interface may be configured to allow a user to drag point descriptors from a list and drop the point descriptors in an appropriate locations in a representation of a building (e.g., a two-dimensional or three-dimensional rendering the building). For example, a point descriptor for a zone temperature sensor on the east wing of the third floor of a building may be dragged from a list to a visual representation of the third floor's east wing. The interface may also be configured to assign relationship among devices and point descriptions. For example, a user may be able to draw a line (e.g., using an input device), on the visual representation of the building, connecting a temperature setpoint device with corresponding air handling unit.

The user interface or report (or underlying data engine) may be configured to aggregate and categorize data points by point type, BAS installation, etc. The GUI elements may include charts or histograms that allow the user to visually analyze the data points. Processing circuit 140 may include one or more GUI servers, services, or engines (e.g., a web service) to support such applications. Further, in some embodiments, applications and GUI engines may be included outside of the processing circuit 140 (e.g., as part of a smart building manager). Processing circuit 140 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Processing circuit 140 may be configured to provide the results of any such processing to other databases, tables, XML files, or other data structures for further querying, calculation, or access by, for example, external monitoring and reporting applications 130.

Classification and mapping module 108 includes word breaker 112. According to an exemplary embodiment, word breaker 112 receives point data from BAS installations and parses them into substrings, words, symbols, terms, etc., based on a statistical model of n-grams. Point data may be received at word breaker 112 from BAS installations 170 via communications electronics 128. Point data may also be received from points for classification 120. word breaker 112 may operate on the data stored in points for classification 120 or training data 122. According to an exemplary embodiment, word breaker 112 operates on the points descriptors of training data 122, which have manually-assigned types. According to another exemplary embodiment, word breaker 112 operates during a "learning" or "training" phase of the classification process described herein.

Word breaker 112 may operate on point data stored in training data 122 to generate one or more collections of BAS terms or symbols. These include relevant symbol list 102 and skip list 104. Relevant symbol list 102 includes substrings, words, symbols, terms, etc., that correlate a data point and a point type. That is, the presence of one or more of the substrings on the relevant symbol list 102 in a point descriptor (e.g., attributes) may indicate a statistical likelihood that the point descriptor belongs to a certain point type. In the discussion herein, "substring," "word," "term," and "symbol" are used interchangeably, and include words, abbreviations, and alpha-numeric descriptors. The substrings may be in different languages. According to an exemplary embodiment, relevant symbol list 102 includes only substrings from training data 122. Relevant symbol list 102 may include multiple words, symbols, terms, abbreviations, etc. (in multiple languages), corresponding to the same data type. This advantageously eliminates the needs for a grammar-, dictionary-, or language-based parser. For example, for descriptions associated with an outside air temperature sensor, the relevant symbol list may include (to the extent these terms are used in training data 122): OAT, OT, OutsideTemp, OutsideTemperature, AuBentemperaturfuhler, ATF, 外部の温度センサ, 室外温度传感器, etc. Relevant symbol list 102 may include a sufficient baseline of terms to accurately (or some approximation thereof) classify points. Word breaker 112 may include a query rewriting scheme and/or word suggestions to correct for misspelled or incomplete point descriptions.

Skip list 104 includes substrings, words, symbols, terms, etc., that will not be taken into account during frequency analysis (in some embodiments, carried about by learner 114). A symbol may be added to skip list 104 when it occurs in many training samples across point types. A high frequency may indicate that the substring is always or almost always included in BAS point descriptors and will not be useful in distinguishing between point types. For example, "BAS" may be a substring that is included in all point descriptors for a given BAS installation. Because "BAS" is not likely to indicate what point type (e.g., Supply Flow Setpoint, Supply Flow, etc.) a data point belong to, "BAS" may be added to skip list 104.

According to an exemplary embodiment, word breaker 112 is configured to generate relevant symbol list 102, skip list 104, etc., automatically. In other embodiments, a user may manually add, remove, and/or modify terms in the lists. Relevant symbol list 102, skip list 104, etc. may include multilingual terms. Lists 102, 104 may also include terms found from multiple BAS installations. Lists 102, 104 may also store charts, databases, arrays, data objects, etc. that describe the terms. For example, a relational database may be used to store attributes for one or more terms, including whether they are relevant terms or terms to be skipped. Lists 102, 104 may include past and/or current lists.

Memory 160 includes learner 114. Learner 114 is an implementation of the probability calculation methods discussed herein. Two exemplary embodiments of learner 114 are described in greater detail in the discussions of FIGS. 2A, 2B. Learner 114 receives substrings from relevant symbol list 102 and point descriptions from training data 122. In one embodiment (described in FIG. 2A), learner 114 calculates the frequency that substrings in relevant symbol list 102 appear in attributes of training data 122. Learner 114 also generates a matrix with columns of attributes of the same point type (concatenated into one string), rows of each substring of the relevant symbol list 102, and individual elements of the frequency that each of the relevant substrings appear in the concatenated descriptions. Using the frequency matrix, learner 114 also generates a description of a probability, for each substring in the relevant symbol list 102, that the presence of a substring in a description of the data point indicates that the data point belongs to a particular point type. In another embodiment (described in FIG. 2B), learner 114 generates a frequency matrix, similar to the one described above. Using singular value decomposition (SVD), learner 114 also decomposes the frequency matrix into three different matrices. According to an exemplary embodiment, SVD filters the non-relevant substrings within a point type. Learner 114 also reconstructs an approximated frequency matrix as the product of portions of the three decomposed matrices. Learner 114 also generates a representation of the probability (e.g., a cosine distance), between a vector associated with a relevant substring and a vector associated with point descriptors of a point type. In some embodiments of learner 114, weighted frequencies are used to generate the frequency matrix. A BAS operator may utilize GUI services 110 to initiate, modify, end, and/or view the processes associated with learner 114. Frequency matrices and probabilities calculations may be transmitted and stored in learning results 118.

Memory 160 includes classifier 116. According to an exemplary embodiment, classifier 116 is an implementation of the naive Bayes categorization discussed herein. In other embodiments, classifier 116 may be used with latent semantic indexing. Classifier 116 receives points descriptions (e.g., attributes) from points for classification 120 and representations of probability computations from learner 114. Classifier 116 maximizes a probability that the presence of a substring from the relevant symbol list 102 in the attributes of a data point indicates that the data point belongs to a particular point type. Classifier 116 probabilistically assigns a point type from BAS point type list 106 to the point descriptors of points for classification 120 based on the maximized probability. A BAS operator may utilize GUI services 110 to initiate categorization, view the assigned point descriptions, etc. GUI services 110 may be configured to allow a BAS operator to manually reassign a point descriptor to a different point type. The assigned point types may be transmitted and stored in annotated system configuration 126.

In some embodiments, classifier 116 may be additionally configured to determine whether further training must be completed on points for classification 120 (e.g., after additional points from BAS installations 170 have been added to points for classification 120). Classifier 116 may do so by calculating a dissimilarity between a relevant symbol list 102 generated using a previous dataset from points for classification 120 and a relevant symbol list 102 generated using a current dataset from points from classification 120. When further training is required, classifier 116 may transmit a command to word breaker 112 to generate a new relevant symbol list 102 using a different set of training data 122 from points for classification 120, and learner 114 to generate a new frequency matrix and probability description using the new relevant symbol list 102.

Memory 160 includes annotated system configuration 126. According to an exemplary embodiment, annotated system configuration includes the results of classification and mapping module 108. That is, annotated system configuration includes the points of BAS installations 170 and their assigned point types. Annotated system configuration may receive point descriptions from points for classification 120 and assigned point types from classifier 116. When retraining is required, annotated system configuration 126 may transmit previous configurations (e.g., points and assigned point types) to learning results 118. The computational results of classifier 116 from retraining may then be stored in annotated system configuration 126.

Memory 160 includes learning results 118. According to an exemplary embodiment, learning results 118 includes the computational results from word breaker 112, learner 114, classifier 116, etc. An item $\omega_l$, such as point descriptors, in learning results 118 may be represented as:

$$\omega_l = \langle \vartheta_l, \langle p(\vartheta_l), \langle p(\vartheta_l|c_1), p(\vartheta_l|c_2), \ldots, p(\vartheta_l|c_K) \rangle \rangle \rangle$$

where $\vartheta_l$ represents the lth symbol in a dictionary, $p(\vartheta_l)$ is the probability of $\vartheta_l$ in the training data 122, and $p(\vartheta_l|c_K)$ is a probability that a symbol $\vartheta_l$ appears in a point type $c_j$. In some embodiments, learning results includes frequency matrix generated by learner 114. Learning results may also include probability descriptions generated by learner 114. According to an exemplary embodiment, learning results 118 may further include results from past iterations of the computations carried out by processing circuit 140.

Figure 2A:
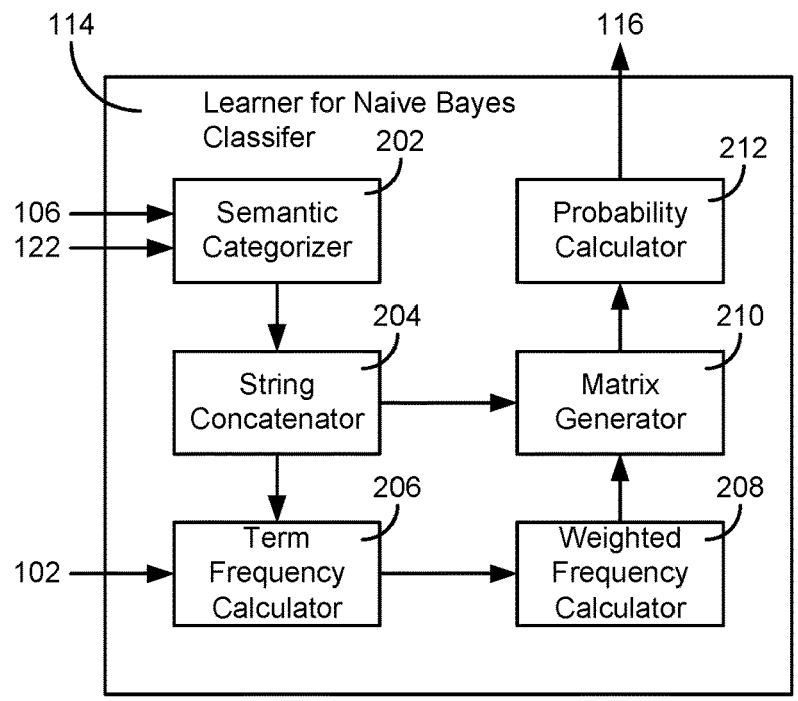
FIG. 2A is a detailed block diagram of the learner of FIG. 1 for a naive Bayes classifier, according to an exemplary embodiment.
Figure 2B:
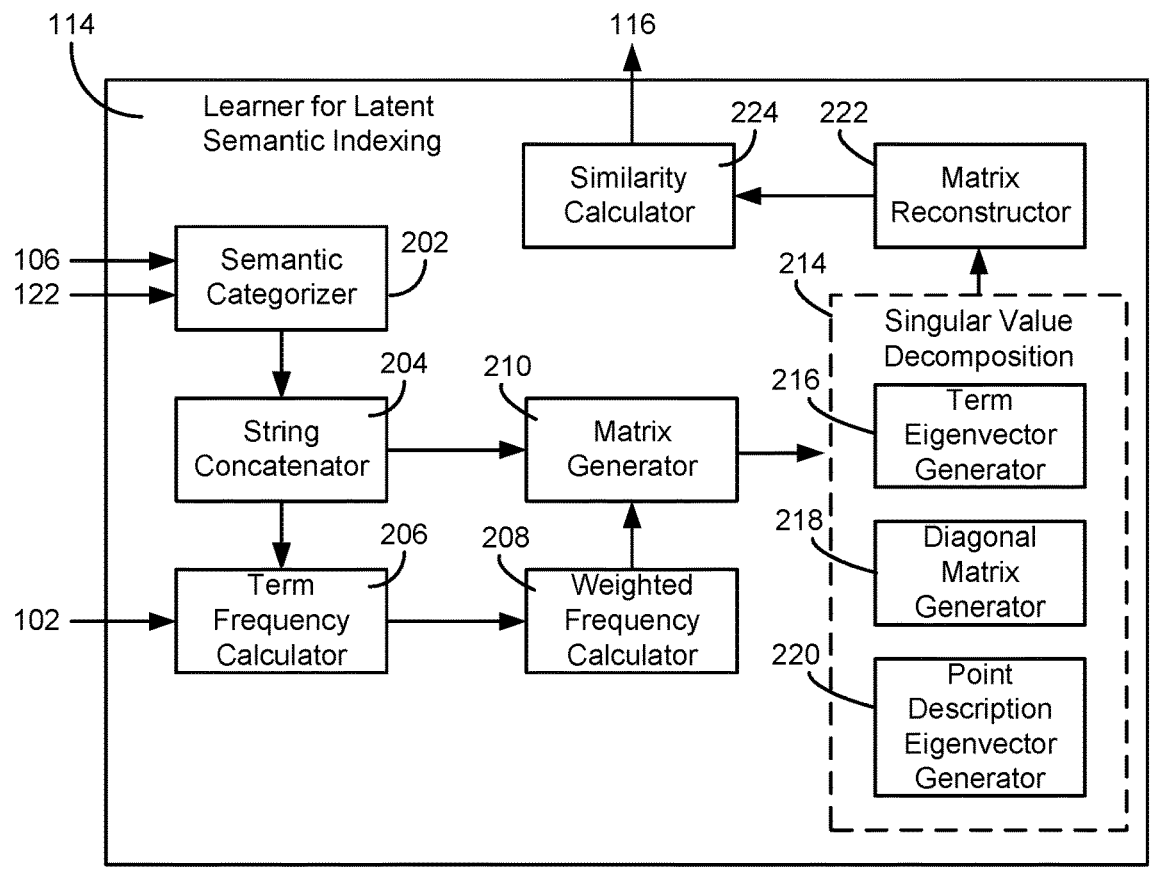
FIG. 2B is a detailed block diagram of the learner of FIG. 1 for latent semantic indexing, according to an exemplary embodiment.

Referring now to FIGS. 2A, 2B, detailed block diagrams of learner 114 of FIG. 1 are shown, according to exemplary embodiments. The embodiment of learner 114 of FIG. 2A may be used in classifying points using a naive Bayes model. The embodiment of learner 114 of FIG. 2B may be used in classifying points using latent semantic indexing. One, the other, or both of the embodiments of learner 114 shown in FIGS. 2A, 2B may be implemented as part of classification and mapping module 108 on processing circuit 140. In both embodiments, learner 114 may receive inputs from BAS point type list 106, training data 122, and relevant symbol list 102. Learner 114 may be configured to calculate the number of times or frequency that terms in relevant symbol list appear in point descriptions of training data 122. Learner 114 may also generate a matrix describing the frequencies. Learner 114 may also generate a representation of the probability that the presence of a substring from relevant symbol list 102 in a point description indicates that the point description belongs to a particular point type. The probability computations may be output to classifier 116.

Referring now to FIG. 2A, a detailed block diagram of learner 114 of FIG. 1 for a naive Bayes classifier is shown, according to an exemplary embodiment. Learner 114 includes semantic categorizer 202. Semantic categorizer 202 receives point types from BAS point type list 102 and point descriptors from training data 122. According to an exemplary embodiment, the point descriptors of training data 122 are manually labeled with point types. Semantic categorizer 202 organizes the point descriptors into groups or categories corresponding to the point type. For example, one or more point descriptors that belong to the zone temperature sensor point class are grouped together. The grouped point descriptors are transmitted to string concatenator 204.

Learner 114 includes string concatenator 204. String concatenator 204 receives point descriptors grouped according to point type from semantic categorizer 202. According to an exemplary embodiment, string concatenator 204 concatenates point descriptors of the same type into one string. Thus, for example, if there are one hundred point descriptors in each of twenty-five point types, string concatenator 204 outputs twenty-five strings. Each string corresponds to one point type and contains the concatenated point descriptors that point type. The concatenated strings are transmitted to term frequency calculator 206 and matrix generator 210. In other embodiments, the strings of a given BMS point type are neither grouped together by semantic categorizer 202 nor concatenated by string concatenator 204. Rather, the point types from BAS point type list 106 and point descriptors from training data 122 are transmitted directly to term frequency calculator 206.

Learner 114 includes term frequency calculator 206. According to an exemplary embodiment, term frequency calculator 206 receives concatenated strings from string concatenator 204 and terms from relevant symbol list 122. Term frequency calculator 204 calculates, for each substring in relevant symbol list 122 and for each concatenated string, the frequency that the substring appears in the concatenated string. The frequency $f^{c_j}(\vartheta_l)$ that substring $\vartheta_l$ occurs in BMS point type $c_j$ is:

$$f^{c_j}(\vartheta_l) = \sum_{x=1}^{L} f_{(x,l)}^{c_j},$$

where L is the number of substrings in relevant symbol list 102. According to an exemplary embodiment, each concatenated string corresponds to one point type. In some embodiments, the calculated frequencies are transmitted directly to matrix generator 210. In other embodiments, the calculated frequencies are transmitted to weighted frequency calculator 208.

Learner 114 includes weighted frequency calculator 208. Weighted frequency calculator 208 receives calculated frequencies from term frequency calculator 206. According to an exemplary embodiment, direct usage of a raw frequency in estimating probability may falsely emphasizes certain features. This may be true, for example, if a symbol occurs in many point types (i.e., this symbol has a high frequency). As a result, the symbol will tend to incorrectly emphasize the points that contain the symbol. For example, a point description may include the customer name and a building floor level. Both the customer name and building floor level may have a high number of occurrences and may not be good features to classify the descriptor. The relevance of a irrelevant symbol in classification can be reduced. To do so, a frequency weighting scheme may be applied before converting raw frequencies into probabilities. According to an exemplary embodiment, inverted document frequency is to panelize irrelevant terms. The inverse measure of the informativeness $idf(\vartheta_l)$ of a symbol $\vartheta_l$ is $$idf(\vartheta_l) = \log\left(\frac{N}{df(\vartheta_l)}\right),$$

where N is the total number of symbols observed from the training set and $df(\vartheta_l)$ is the number of point descriptors containing a symbol $\vartheta_l$. Applying invented document frequency to the term frequency calculation (as described in the discussed of term frequency calculator 206), the weighted frequency of a symbol $\vartheta_l$ is $$f_{(x,y)}' = f_{(x,y)} \times idf(\vartheta_l).$$

According to an exemplary embodiment, the weighted frequency is calculated for each symbol in relevant symbol list 102 across the concatenated strings for each point type. The weighted frequencies are transmitted to matrix generator 210.

Learner 114 includes matrix generator 210. According to an exemplary embodiment, matrix generator 210 receives concatenated strings from string concatenator 204 and weighted frequencies from weighted frequency calculator 208. Matrix generator 210 constructs an M by K matrix A:

$$A = \begin{bmatrix} f_{(1,1)}' & \cdots & f_{(M,1)}' \\ \vdots & \ddots & \vdots \\ f_{(1,K)}' & \cdots & f_{(M,K)}' \end{bmatrix},$$

where M is the number of training samples in the set of training samples X (i.e., the number of concatenated strings of point descriptors) and K is the number of target classes in a training set (i.e., the number of symbols in relevant symbol list 102). Each element represents the weighted frequency $f_{(x,y)}'$ of a symbol in a concatenated string of point descriptors. Each row represents occurrences of a symbol across strings of point descriptors. Each column represents the frequency of symbols in a string of point descriptors. According to an exemplary embodiment, the initial values of A are filled with 1.0, to prevent divide by zero error. In some embodiments, matrix generator 210 receives un-weighted frequencies from term frequency calculator 206.

In other embodiments, matrix generator 210 receives point descriptors along with manually assigned point types (but not concatenated strings) from training data 122. In such an embodiment, a matrix may be constructed by matrix generator 210, with each element corresponding to the frequency of a symbol, a point descriptor, and a point type. Matrix generator 210 transmits the constructed matrix A to probability calculator 212. In some embodiments, matrix generator 210 transmits matrix A to learning results 118.

According to an exemplary embodiment, and as described below, latent semantic indexing may be generate a matrix A. Matrix A may be deconstructed using singular value decomposition, as described below. A portion of the deconstructed matrices may be used to reconstruct a matrix A', which is an approximation of matrix A. Matrix A' may be used in place of matrix A in the discussion herein.

Learner 114 includes probability calculator 212. Probability calculator 212 receives frequency matrix A or matrix A' from matrix generator 210. Probability calculator 212 uses frequency matrix A or matrix A' to calculate the probability $p(\vartheta_l)$ of the frequency of a symbol $\vartheta_l$ in a training sample (i.e., a concatenated string):

$$p(\vartheta_l) = \frac{\sum_{x=1}^{L} f'_{(x,y)}}{\sum_{x=1}^{L}\sum_{y=1}^{M} f'_{(x,y)}},$$

where $f_{(x,y)}'$ is the weighted frequency of a symbol in a training sample (i.e., a concatenated string), L is the number of symbols in relevant symbol list 102, and M is the number of training samples in the set of training samples X (i.e., the number of concatenated strings of point descriptors).

According to an exemplary embodiment, probability calculator 212 generates a description of the probability that the presence of one of the terms in relevant symbol list 102 in a representation of a data point indicates that the data point belongs to a particular point type. That is, probability calculator 212 also uses frequency matrix A or matrix A' to calculate the probability $p(\vartheta_l|c_K)$ that a symbol $\vartheta_l$ appears in a class $c_j$:

$$p(\vartheta_L | c_j) = \frac{f^{c_j}(\vartheta_l)}{n_j},$$

where $f^{c_j}(\vartheta_l)$ is the frequency of a symbol J in point type $c_j$ (as described in the discussion of term frequency calculator 206 and weighted as described in the discussion of the weighted frequency calculator 208).

$$n_j = \sum_{x=1}^{L}\sum_{r=1}^{M} f^{c_j}_{(x,y)}$$

and is the total occurrence of all symbols in the training sample (i.e., concatenated string) labeled $c_j$. The probability $p(\vartheta_l|c_K)$ that symbol $\vartheta_l$ appears in class $c_j$ is transmitted to classifier 116. In some embodiments, probability calculator 212 transmits probability $p(\vartheta_l|c_K)$ to learning results 118.

Referring now to FIG. 2B, a detailed block diagram of learner 114 of FIG. 1 for latent semantic indexing (LSI) is shown, according to an exemplary embodiment. LSI is a semantic sensitive document clustering technique that captures and preserves recurring term usage patterns. LSI maps documents and queries into a lower dimensional space. LSI involves the creation of a term to document matrix A. The matrix A is an u by v matrix, where u is the number of documents (e.g., concatenated strings corresponding to point types), and v is the number of terms (e.g., from relevant symbol list 102) observed from a document collection (set of concatenated strings). The matrix A described in this paragraph may be similar to the matrix A described in the discussion of matrix generator 210 (FIG. 2A). Semantic categorizer 202, string concatenator 204, term frequency calculator 206, weighted frequency calculator 208, and matrix generator 210 of FIG. 2B are substantially as described in the discussion of FIG. 2A.

In the embodiment of FIG. 2B, learner 114 additionally includes singular value decomposition (SVD) 214. SVD 214 receives a term to document matrix A from matrix generator 210. SVD 214 includes term eigenvector generator 216, diagonal matrix generator 218, and point description eigenvector generator 220. By using SVD, matrix A can be decomposed into the product of three different matrices: the term eigenvector U; the diagonal matrix of singular values S; and the point description eigenvector $V^T$. Generators 216, 218, 220 construct matrices U, S, and $V^T$, respectively. U is a matrix of eigenvectors derived from a term-to-term similarity matrix defined in the document space by measuring correlation. (The term-to-term similarity matrix serves similar role of the covariance matrix in principal component analysis.) $V^T$ is a matrix of eigenvectors derived from a document-to-document (i.e., concatenated string-to-concatenated string) similarity matrix defined in the term space by comparing a term profile of a document. S is an r by r diagonal matrix of singular values, where r is the rank of A. Matrices U, S, and $V^T$ may be referred to as the second, third, and fourth matrices respectively. SVD 214 transmits the matrices U, S, and $V^T$ to matrix reconstructor 222. In other embodiments, more, fewer, or different matrices are transmitted to matrix reconstructor 222.

In the embodiment of FIG. 2B, learner 114 includes matrix reconstructor 222. Matrix reconstructor 222 receives matrices U, S, and $V^T$ from SVD 214. Matrix reconstructor 222 is configured to construct a matrix A' that approximates term to document matrix A. Matrix A' may be referred to as the fifth matrix. Matrix A can be approximated by keeping first k singular values from S, and the corresponding columns from U and $V^T$. k is the approximation quality control constant. k should be large enough to allow for fitting of the characteristics of the data and small enough to eliminate the non-relevant representational details. According to an exemplary embodiment, k is set to 70%. In other embodiments, k may be greater than or less than 70%. Approximation of the original term-to-document matrix A can be obtained by $$A' = U_k S_k V_k^T \cong A,$$

where $U_k$ and $V_k^T$ represent matrixes that keep the first k columns from U and $V^T$, and $S_k$ is a matrix that has the first k singular values. Matrix reconstructor 222 transmits matrix A' to similarity calculator 224. In some embodiments, matrix A' may be transmitted to learning results 118.

With a careful selection of k (e.g., determined by evaluating precision and recall), SVD provides a modified vector space, where non-relevant terms within a BMS point type are filtered. Transitive co-occurrence of terms is captured by measuring the correlations among terms, while principal component analysis (PCA) uses covariance analysis. LSI assumes that there are strong associations between terms in text. According to an exemplary embodiment, such associations exist in the building management data point classification domain. Eventually, the dimension reduction step in LSI captures the semantic relationships by analysis of term co-occurrences. The dimension reduction step modifies the component matrices in such a way that terms observed in some documents may appear with greater or lesser estimated frequency and some non-observed terms in the input may appear (at least fractionally).

According to an exemplary embodiment, matrix A' is used to calculate the probability $p(\vartheta_l)$ of the frequency of a symbol $\vartheta_l$ in a training sample (i.e., a concatenated string). Matrix A' may also be used to calculate the probability $p(\vartheta_l|c_K)$ that a symbol $\vartheta_l$ appears in a class $c_j$. Thus, the methods and systems described herein may advantageously utilize latent semantic indexing in conjunction with a naive Bayes classifier.

In the embodiment of FIG. 2B, learner 114 includes matrix similarity calculator 224. Similarity calculator 224 may receive approximated term-to-document matrix A' from matrix reconstructor 222. Similarity calculator 224 generates a representation of the probability that the presence of one of the terms in relevant symbol list 102 in a description of a data point indicates that the data point belongs to a particular point type. The probability may be represented by a cosine distance, which measures the probability based on an angle between a query and a target vector. The similarity or cosine distance $\delta(q,t_k)$ between a query vector q (representing a substring in relevant symbol list 102) and a training sample vector $t_k$ (representing a concatenated string of point descriptors in a given class) is:

$$\delta(q, t_k) = \cos(\theta) = \frac{q \cdot t_k}{\|q\| \cdot \|t_k\|}$$

The similarity or cosine distance $\delta(q,t_k)$ may be transmitted to classifier 116. In some embodiments, matrix similarity calculator 224 may transmit similarity or cosine distance $\delta(q,t_k)$ to learning results 118.

Figure 3:
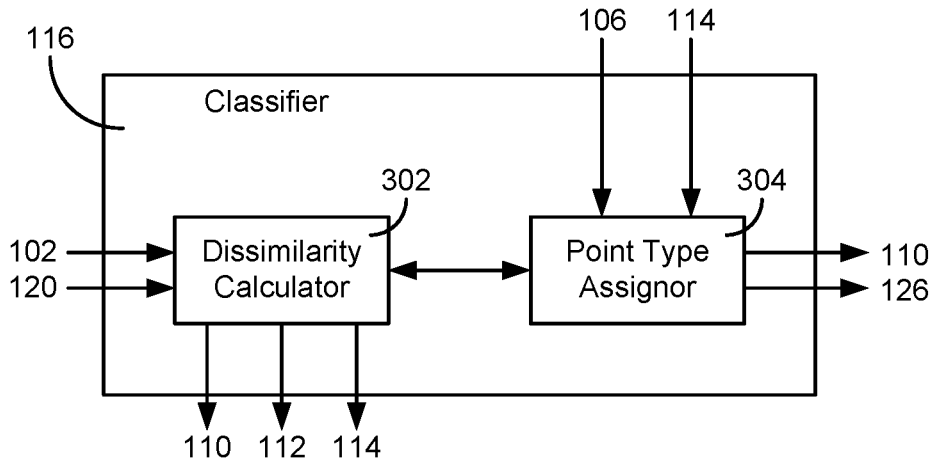
FIG. 3 is a detailed block diagram of the classifier of FIG. 1, according to an exemplary embodiment.

Referring now to FIG. 3, a detailed block diagram of classifier 116 of FIG. 1 is shown, according to an exemplary embodiment. Classifier 116 of FIG. 3 may be configured to classify points using a naive Bayes model or latent semantic indexing. In other embodiments, different methods may be used. Classifier 116 may be implemented as part of classification and mapping module 108 on processing circuit 140. Classifier 116 may receive input from relevant symbol list 102, BAS point type list 106, points for classification 120, and training data 122. Classifier 116 may determine a maximum probability that the presence of a substring from the relevant symbol list 102 in the description of a data point indicates that the data point belongs to a particular point type. Classifier 116 assigns a point type from BAS point type list 106 to the point descriptors of points for classification 120 based on the probabilistic determination. Classifier 116 may also be configured to determine whether retraining is required. The assigned point type may be output to GUI services 110 and annotated system configuration 126.

Classifier 116 includes dissimilarity calculator 302. Dissimilarity calculator 302 receives symbols from relevant symbol list 102 and point descriptors from points for classification 120. According to an exemplary embodiment, dissimilarity calculator 302 determines whether retraining is required. Retraining may include generation of a new relevant symbol list 102, frequency matrix, and probability representation. Retraining is required when the terms used in the point descriptors of points for classification 120 are sufficiently (i.e., beyond a threshold amount) different from the terms in relevant symbol list 102. This indicates that the classification and mapping module 108 is less than well-suited, with the then-existing relevant symbol list 120, frequency matrix, and probability representation, to probabilistically classify points based on the symbols in the point descriptors. In some embodiments, dissimilarity calculator 302 may be provided as part of classifier 116. In other embodiments, dissimilarity calculator 302 may be provided as part of learner 114 or as a separate component of classification and mapping module 108.

The need for retraining may arise, e.g., with a new set of points that is added to points for classification 120. For example, a new BAS installation (with a new set of data points) may be added to the system with processing circuit 140. In some embodiments, the need for new training is determined based on how many symbols have been seen or not been seen by classifier 116. Given a new set of points, keyword and symbol extraction is performed by, e.g., word breaker 112. Keyword and symbol extraction is described in the discussion of word breaker 112 and results in a new list of relevant symbols. B is a new set of vocabularies (i.e., keywords, symbols, terms, etc.) from the new set of points (i.e., new query) to be classified and D is the set of terms (e.g., relevant symbol list 102) obtained during the training phase. The dissimilarity between D and B can be measured with the following form:

$$(B, D) = \frac{|B \cup D| - |B \cap D|}{|B \cup D|} = 1 - \frac{|B \cap D|}{|B \cup D|}.$$

This is the Jaccard index or dissimilarity, which measures the complementary rate of intersection of two sets. If two sets are identical (i.e., the terms from both sets of points are identical), then the equation equals one. If an intersection of two sets is empty (i.e., the two sets of the points share no terms), then the equation equals zero. A thresholding parameter (e.g., (B,D)=0.3) can be used to determine when a classifier needs additional training. When retraining is required, a notification may be provided to GUI services 110. Dissimilarity calculator may also provide commands to, e.g., word breaker 112 to generate a new relevant symbol list and learner 114 to generate a new frequency matrix and/or probability description. When retraining is not required, dissimilarity calculator 302 may provide a command to point type assignor 304 to probabilistically assign point types to points for classification 120. In other embodiments, a different method (other than calculating the Jaccard dissimilarity between relevant terms of two sets of points) may be used to determine when retraining is required.

Classifier 116 includes point type assignor 304. Point type assignor 304 receives point descriptors from points for classification 120, point types from BAS point type list 106, and probability descriptions from learner 114. According to an exemplary embodiment, point type assignor 304 probabilistically assigns point types (from BAS point type list 106) to point descriptors (from points for classification 120) using probability representations (from learner 114). A point type that maximizes the value of the probability representation is assigned to the particular point. The assigned point types are transmitted to GUI services 110 and/or annotated system configuration 126.

In some embodiments, point type assignor 304 is a naive Bayes classifier. Naive Bayes is an efficient and effective inductive learning algorithms for machine learning and data classification. Typically, an example X (e.g., a set of concatenated strings) is represented by a tuple of attribute values $X = \langle x_1, x_2, \ldots x_n \rangle$, where $x_i$ (e.g., one concatenated string) is the value of ith attribute of example X. C represents the classification variable, and c is the value (e.g., a point type label) of C. Calculation of probability of example X becomes class c is:

$$p(c \mid X) = \frac{p(X \mid c)p(c)}{P(E)}.$$

According to an exemplary embodiment, all attributes (e.g. words in a document) are independent given a class label of the class variable. Then p(X|c) is equivalent to $$p(X \mid c) = p(x_1, x_2, \ldots, x_n \mid c) = \prod_{i=1}^{n} p(x_i \mid c)$$

Example X may be classified by finding a class value $c_j$ that maximizes the above equation. That is, $$\text{classify}(X) = \arg\max_j \left( \prod_{i=1}^{n} p(x_i \mid c_j) \right), \, 0 < j < K,$$

where K is the number of possible class values (e.g. a number of point types).

In the embodiment of FIG. 3, the point type assignor may be a naive Bayes classifier of the form:

$$\text{classify}(X) = \arg\max_j \left( \prod_{i=1}^{n} p(\vartheta_i \mid c_j) \right), \, 0 < j < K,$$

where $p(\vartheta_l \mid c_K)$ is the probability that symbol $\vartheta_l$ appears in class $c_j$ received from the probability calculator 212. Point type assignor 304 assigns, to a point descriptor, the point type that maximizes the equation. Various mathematical methods may be used to compute the naive Bayes classifier. In other embodiments, point type assignor 304 is a classifier for latent semantic indexing. Point type assignor 304 assigns to a point descriptor the point type that maximizes the similarity or cosine distance $\delta(q,t_k)$, as described in the discussion of similarity calculator 116. The similarity or cosine distance may have a maximum value of one. A point type that maximizes the cosine distance results in the cosine distance approach (or reaching) one.

Figure 4:
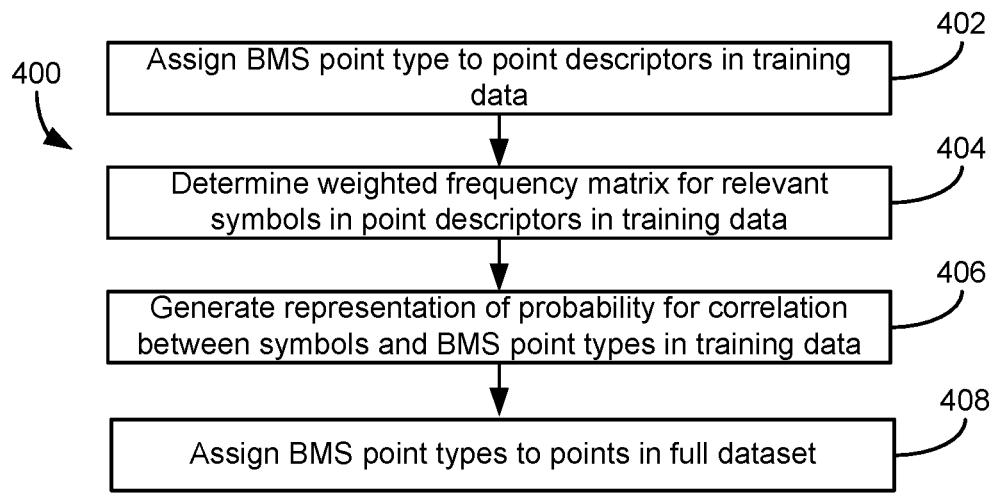
FIG. 4 is a flow diagram of a process for probabilistically assigning building management system point types, according to an exemplary embodiment.

Referring now to FIG. 4, a flow diagram of a process 400 for probabilistically assigning point types is shown, according to an exemplary embodiment. Process 400 may be implemented on, e.g., processing circuit 140. In some embodiments, steps 402-406 of process 400 may be characterized as a "learning" or "training" phase. Steps 402-406 may operate on a subset of data, whereas step 408 operates on a full set of data (e.g., all point descriptors from BAS installations 170). Process 400 may be a high-level representation of the process described in more detail in FIGS. 5 and 6.

Process 400 includes assigning point types to point descriptors in training data (402). According to an exemplary embodiment, the point types are assigned manually (e.g., by a BAS operator). A BAS operator may use one or more GUIs provided by GUI services 110 to assign point types. The point types may include those enumerated in the discussion of BAS point type list 106 (FIG. 1). The point descriptors in training data may be a subset of all the point descriptors in the full dataset (e.g., across all BAS installations). Step 402 may advantageously reduce the number of points that are required to be manually assigned compared to the current process, which involves complete manual classification of points. According to an exemplary embodiment, the training data may be selected so that the manually-assigned point descriptors are evenly or nearly evenly distributed across point types, physical location (e.g., BAS installation), etc.

Process 400 includes determining a weighted frequency matrix for relevant symbols in the point descriptors in the training data (404). Relevant symbols may be those identified by, e.g., processing circuit 140, to most likely indicate what BMS point type a point belongs to. That is, the presence of the symbol in the point description increases the probability that the corresponding point belongs to a particular point type. Relevant symbols may be determined by word breaker 112 and stored in relevant symbol list 104 (FIG. 1). Processing circuit 140 may calculate at what frequency the symbols occur in each of the point descriptors in the training data. In some embodiments, the points descriptors of the same class are concatenated into one string. In such embodiments, term frequency calculator 206 calculates the frequency that the relevant symbols occur in the strings for each point type. In some embodiments, the calculated frequency may be weighted so that it more accurately represents the utility of a substring in indicating what point type a data point is. For example, a large proportion of points in a dataset may include general substrings, such as "BAS." Because the substring BAS is unlikely to suggest what point type the point belongs to, it is less useful than other terms, such a "ZN_T-?" (indicating zone temperature). Using the calculated frequency alone may overemphasize commonly-appearing, but less relevant terms. According to an exemplary embodiment, inverted document frequency (IDF) is used to weight the frequencies. Processing circuit 140 may be configured to generate a matrix of the weighted frequencies. According to an exemplary embodiment, matrix generator 210 constructs a matrix with columns of point descriptions of the same point type (concatenated into one string), rows of each substring of the relevant symbol list 102, and individual elements of the weighted frequency that relevant symbols appear in the concatenated descriptions.

According to an exemplary embodiment, latent semantic indexing may be used in conjunction with a naive Bayes classifier. A matrix A' may be generated using latent semantic indexing. Matrix A' may then be used to calculate the probability $p(\vartheta_l)$ of the frequency of a symbol $\vartheta_l$ in a training sample (i.e., a concatenated string) and the probability $p(\vartheta_l \mid c_K)$ that a symbol $\vartheta_l$ appears in a class $c_j$.

Process 400 includes generating a representation of the probability of correlation between relevant terms and point types (406). The representation describes the probability that the presence of one or more relevant terms in a description of a data point indicates that the data point belongs to one of a plurality of point types. In some embodiments, for example, when a naive Bayes classifier is used, a probability $p(\vartheta_l \mid c_K)$ that symbol $\vartheta_l$ appears in class $c_j$ is calculated. This is described in more detail in the discussion of probability calculator 212 (FIG. 21). In other embodiments, for example, when latent semantic indexing is used to classify points, a similarity or cosine distance $\delta(q,t_k)$ between a query vector q (representing a substring in relevant symbol list 102) and a training sample vector $t_k$ (representing a concatenated string of point descriptors in a given class) is generated. This is described in more detail in the discussion of similarity calculator 224 (FIG. 2B).

Process 400 includes assigning point types to points in the full dataset (408). The "full dataset" may include all of the points in points for classification 120 or all of the points of BAS installations 170. In other embodiments, a BAS operator may designate a portion of points for classification 120 and/or BAS installations 170 to be assigned point types. According to an exemplary embodiment, the full dataset includes more points than the training dataset. This advantageously obviates the need for manually assigning point types to all points of BAS installations 170. Processing circuit 140 assigns point types by determining a point type-substring pair that maximizes a probability that the presence of the substring in the description of the data point indicates that the data point belongs to the point type. In some embodiments, a naive Bayes classifier may be used. In other embodiments, for example, with latent semantic indexing, a similarity or cosine distance $\delta(q,t_k)$ may be maximized.

Figure 5:
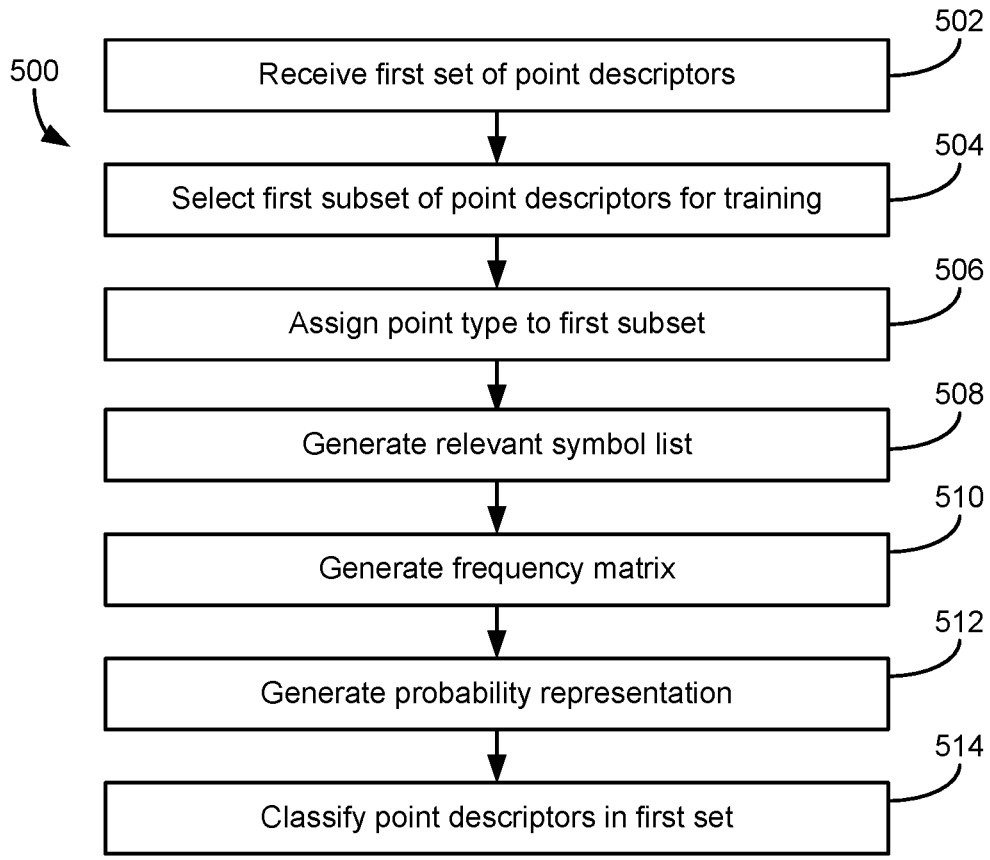
FIG. 5 is a more detailed flow diagram of a process for probabilistically assigning building management system point types, according to an exemplary embodiment.

Referring now to FIG. 5, a more detailed flow diagram of a process 500 for probabilistically assigning point types is shown, according to an exemplary embodiment. Process 500 may be implemented on, e.g., processing circuit 140. In some embodiments, steps 504-514 of process 500 may be characterized as a "learning" or "training" phase. Steps 504-512 may operate on one or more subsets of data, whereas step 514 operates on a full set of data (e.g., all point descriptors from BAS installations 170). Process 500 may be a more low-level description of the process described in FIG. 4.

Process 500 includes receiving a first set of point descriptors (502). The point descriptors may be received at processing circuit 140 from BAS installations 170. The point descriptors may be stored in points for classification 120. In some embodiments, data points (and not point descriptors) may be received at processing circuit 140. Processing circuit 140 may modify (e.g., as described in the discussion of points for classification 120) and concatenate the attribute values for each of the points, and store the now-point descriptors in points for classification 120.

Process 500 includes selecting a first subset of the first set of point descriptors for training (504). According to an exemplary embodiment, the first subset is a proportion of point descriptors selected by a BAS operator. The first subset may be designated by a BAS operator at a user interface generated by GUI services 110 (FIG. 1). The first subset may be stored as training data 122.

Process 500 includes assigning point types to the first subset of point descriptors (506). According to an exemplary embodiment, the point types are manually assigned to the subset. The point types may include those enumerated in the discussion of BAS point type list 106. Manually assigning point types to only a subset of point descriptors and probabilistically assigning classes to the remaining point descriptors eliminates the need to manually label all of the point descriptors. This may advantageously reduce the time, error, etc., associated with completely manual point classification. A BAS operator may use a user interface generated by GUI services 110 (FIG. 1) to label the point descriptors. The labeled point descriptors may be stored as training data 122.

According to an exemplary embodiment, process 500 continues with "classifier training," including steps 508-512, which are described in more detail below. In some embodiments, all of the labeled point descriptors (i.e., the first subset selected in step 504) are used in classifier training. That is, all of the point descriptors that are manually labeled are used to generate a relevant symbol list, frequency matrix, and probability description. In other embodiments, a fewer than all of the labeled point descriptors may be used for classifier training. For example, from the nineteen thousand points (the first subset) that were manually assigned point types, six thousand may be selected for classifier training. The subset that is selected for classifier training may be evenly or near-evenly distributed across point types, physical locations (e.g., BAS installations), etc.

Process 500 includes generating a relevant symbol list using the subset of labeled point descriptors (508). The relevant symbol list may be described as a first plurality of terms. The relevant symbol list includes substrings, words, symbols, terms, abbreviations, etc. (in multiple languages) that are extracted from the point descriptors. As described in the discussion of word breaker 112 (FIG. 1), relevant symbol list 102 (FIG. 1), and step 404 of process 400 (FIG. 4), the relevant symbol list contains substrings that are probabilistically likely to indicate that a point descriptor containing the substring belongs to a particular point type. According to an exemplary embodiment, the relevant symbol list is generated by word breaker 112 and stored as relevant symbol list 102 (FIG. 1). In some embodiments, a skip list may also be generated (as described in the discussion of word breaker 112 and skip list 104). The skip list contains substrings that are determined to be not relevant in determining whether a point descriptor belongs to a particular BMS point type.

Process 500 includes generating a frequency matrix (510). As described in the discussions of matrix generator 210 (FIG. 2A) and step 404 of process 400 (FIG. 4), a frequency matrix includes the frequency that each of the symbols in the relevant symbol list appears in descriptions of the labeled data points. In some embodiments, the frequencies may be weighted (e.g., using inverted document frequency). In some embodiments, the point descriptors of a given point type may be concatenated into one string. According to an exemplary embodiment, matrix generator 210 (FIG. 2A, 2B) constructs the frequency matrix. The process for generating the frequency matrix is described in more detailed in the discussion of FIG. 6. according to an exemplary embodiment, the frequency matrix may be generated using latent semantic indexing.

Process 500 includes generating a probability representation (514). As described in the discussions of probability calculator 212 (FIG. 2A), similarity calculator 224 (FIG. 2B), and step 406 of process 400 (FIG. 4), the probability description describes the likelihood that the presence of one or more symbols in a point descriptor indicates that the point descriptor belongs to a particular point type. The probability description may be of the form $p(\vartheta_l | c_K)$, i.e., the probability that symbol $\vartheta_l$ appears in BMS point type $c_j$. This description may be used when classifying points using a naive Bayes method. The probability description may also be of the form $\delta(q,t_k)$ (describing a similarity or cosine distance). This description may be used when classifying points using latent semantic indexing. The probability description may be generated by probability calculator 212 (FIG. 2A) or similarity calculator 224 (FIG. 2B), and may be based on the frequency matrix generated in step 510.

Process 500 includes classifying points descriptors in the first set (514). The first set of point descriptors includes the first subset, the second subset, and/or additional point descriptors. The first subset includes the manually labeled point descriptors. The second subset includes the unlabeled point descriptors. Process 500 and other methods described herein thus advantageously classify points of the second subset in an automated manner. According to an exemplary embodiment, the points are classified probabilistically, based on the representation generated in step 512. As described in the discussions of point type assignor 304 (FIG. 3) and step 408 of process 400 (FIG. 4), a point type is assigned to a data point descriptor when the particular point type maximizes a probability that substrings in the point descriptor indicate that the data point belongs to the point type. This may be a substring-point type pair that has the greatest indication of probability. In some embodiments, a naive Bayes classifier is used. Processing circuit 140 assigns BMS point types based on calculating:

$$\text{classify}(X) = \arg\max_j \left( \prod_{i=1}^n p(\vartheta_i \mid c_j) \right), 0 < j < K.$$

Various mathematical methods may be used to compute the naive Bayes classifier. In other embodiments, for example, when latent semantic indexing is used, processing circuit 140 maximizes a similarity or cosine distance $\delta(q, t_k)$ between a query vector q (representing a substring in relevant symbol list 102) and a training sample vector $t_k$ (representing a concatenated string of point descriptors in a given class).

Figure 6:
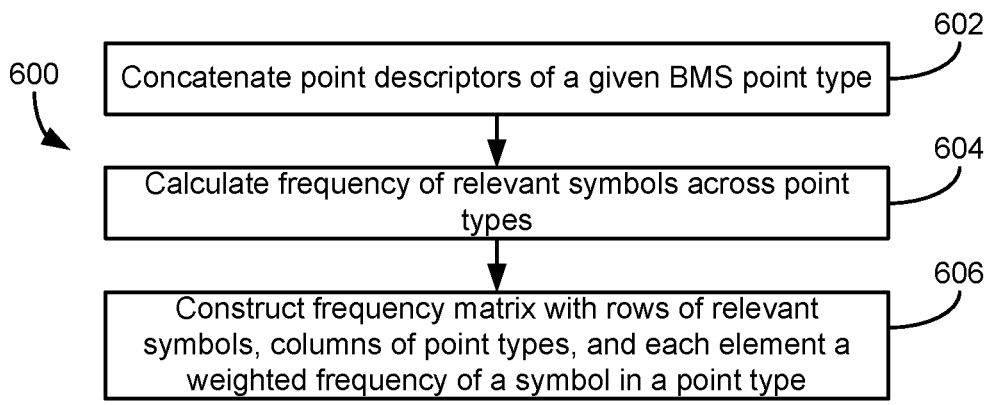
FIG. 6 is a flow diagram of a process for generating a frequency matrix, according to an exemplary embodiment.

Referring now to FIG. 6, a flow diagram of a process 600 for generating a frequency matrix is shown, according to an exemplary embodiment. Process 600 may be implemented on, e.g., processing circuit 140. Process 600 describes step 512 of process 500 (FIG. 5) in more detail. In other embodiment, different methods may be used to generate the frequency matrix. For example, latent semantic indexing may be used.

Process 600 includes concatenating points descriptors of a given point type (602). According to an exemplary embodiment, the manually-labeled point descriptors are grouped by point type. This may be done by semantic categorizer 202 (FIG. 2A, 2B). String concatenator 204 concatenates the point descriptors of a given type into one string. A string of point descriptors $D_{c_j}$ for a jth point type $c_j$ is $D_{c_j} = d_{(c_j,1)} \cdot @ \cdot d_{(c_j,2)} \cdot @ \ldots @ \cdot d_{(c_j,n)}$, where $d_{(c_j,i)}$ is the ith point descriptor manually assigned to point type $c_j$, · is a string concatenation operator, and @ is a delimiter. Each point type may be associated with one string of point descriptors. Concatenating the strings of a given type may advantageously reduce the size of matrix generated using the strings (as described in step 606). In turn, this may advantageously decrease the size of memory 160 (FIG. 1), which may store data representing the matrix. In other embodiments, point descriptors of a given type may not be concatenated, and the frequency matrix may be generated (as described in step 606) with each element corresponding to the frequency of a symbol, the point descriptor, and the point type.

Process 600 includes calculating the frequency of relevant terms across BMS point types (604). As described in the discussion of term frequency calculator 206 (FIG. 2A) and step 404 of process 400 (FIG. 4), for each relevant symbol and for each concatenated string of point descriptors, the frequency that a relevant symbol appears in a concatenated string is calculated. Frequency calculator 206 (FIG. 2A) may calculate the frequencies. Because the concatenated strings represent point types (as described in step 602), calculating the frequency of the symbols across the concatenated strings is equivalent to calculating the frequency across point types. According to an exemplary embodiment, the calculated frequencies are weighted using an inverted document frequency factor. This is described in the discussion of weighted frequency calculator 208 (FIG. 2A).

Process 600 includes constructing a frequency matrix with the relevant symbols, concatenated strings, and weighted frequencies (604). The frequency matrix may be described as the first matrix. As described in the discussion of matrix generator 210 and step 404 of process 400 (FIG. 4), the frequency matrix is constructed with columns of concatenated descriptions (i.e., each column corresponds to a different concatenated description or a different point type), rows of relevant substrings (i.e., each row corresponds to a different relevant substring), and individual elements of the weighted frequency that each of the relevant substrings appears the concatenated descriptions. Matrix generator 210 may construct the frequency matrix.

Figure 7:
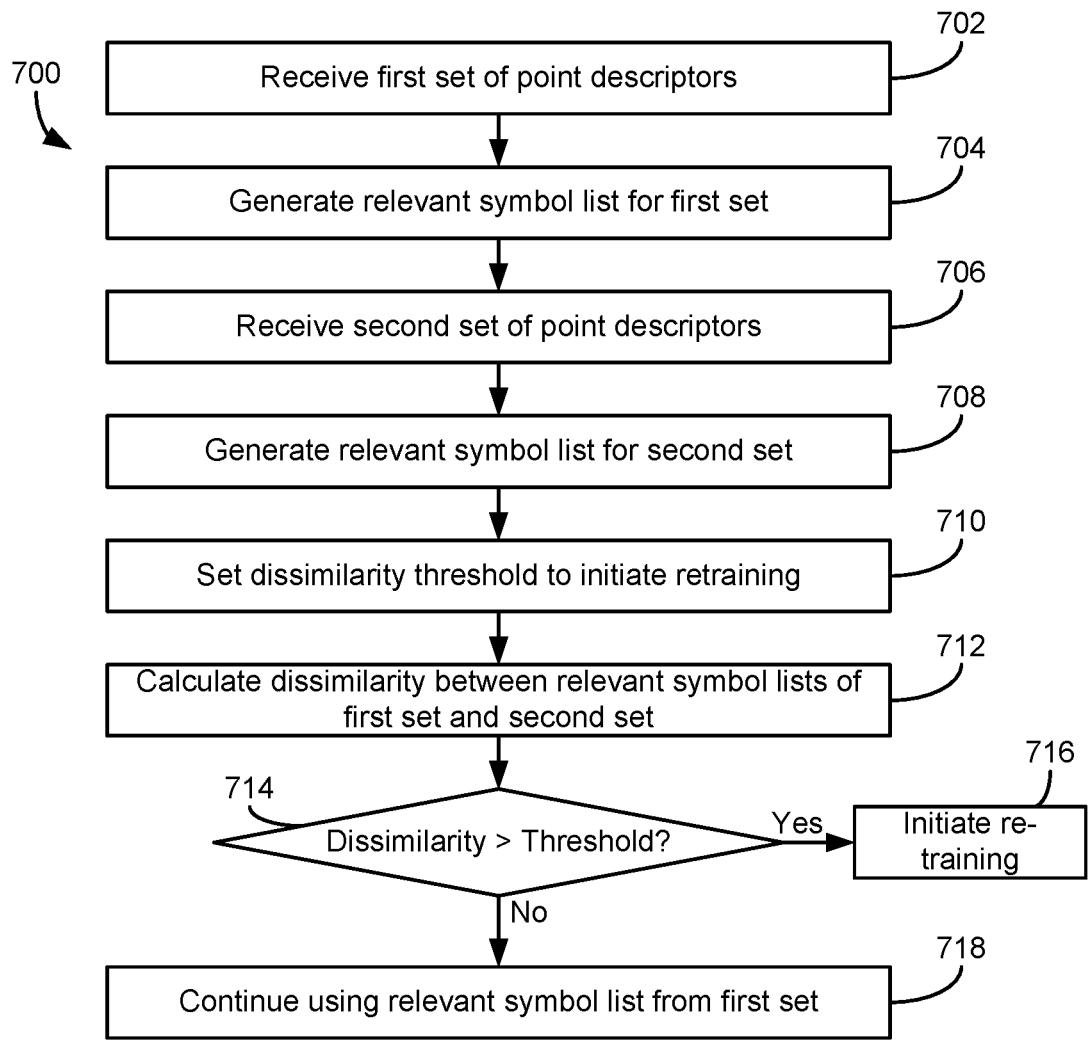
FIG. 7 is a flow diagram of a process for determining whether retraining is required, according to an exemplary embodiment.

Referring now to FIG. 7, a flow diagram of a process 700 for determining whether retraining is required, according to an exemplary embodiment. Process 700 determines whether the relevant symbol list (from step 510 of process 500), frequency matrix (from step 512 of process 500), and probability description (from step 514 of process 500) are sufficiently representative of the points being classified. That is, process 700 determines whether the terms that are used in the points to be classified are similar enough to the terms used to generate the relevant symbol list, frequency matrix, and probability description, such that the points will be classified accurately. If there is too much divergence between the terms used in the current points for classification and the terms used to generate the relevant symbol list, frequency matrix, and probability description, retraining may be initiated. Process 700 may be implemented on, e.g., processing circuit 140. According to an exemplary embodiment, process 700 may be completed prior to probabilistically assigning point types. This may advantageously ensure that point types are assigned by a classifier that is representative of the terms used in the points for classification.

Process 700 includes receiving a first set of point descriptors (702) and a second set of point descriptors (706). The first set and second set may each be pluralities of unclassified data points. The point descriptors (or data points, in some embodiments) may be received from BAS installations 170. Steps 702, 704 are substantially as described in the discussion of step 502 of process 500 (FIG. 5). According to an exemplary embodiment, the second set of point descriptors may be received at some time after the first set of point descriptors is received. During that intervening time, the number and/or content of the point descriptors from BAS installations 170 may have changed. For example, the second set may include additional point descriptors that were not present in the first set. This may be the case when additional BAS installations are brought on line. In another example, the second set may include fewer point descriptors than in the first set. However, the second set may include point descriptors with terms that did not appear in the first set. This may be the case when integrating heterogeneous building automation systems (i.e., those using different point description vocabularies).

Process 700 includes generating relevant symbol lists for the first set (704) and the second set (708) of point descriptors. Steps 704, 708 may be substantially as described in step 510 of process 500 (FIG. 5). Note that steps 702 (receiving the first set) and 704 (generating a relevant symbol list for the first) maybe completed as part the ordinary process for classifying point descriptors of the first set (as described by, e.g., process 400 and process 500). The relevant symbol list generated for the first set may be valid for one or more sets of points for classification. However, once a number and/or content of the points of classification have changed beyond a certain threshold, the relevant symbol list for the first set of point descriptors may no longer be optimal.

Process 700 includes setting a dissimilarity threshold (710). According to an exemplary embodiment, a quantity may be calculated representing the dissimilarity of the relevant symbol list from the first set of point descriptors and the second set of point descriptors. The dissimilarity threshold describe the point at which retraining is initiated. Process 700 includes calculating the dissimilarity between the relevant symbol lists for the first set and second set (712). According to an exemplary embodiment, the dissimilarity is calculated using Jaccard dissimilarity. This is described in the discussion of dissimilarity calculator 302 (FIG. 3). If two lists are identical (i.e., the same terms are used in both sets), then the Jaccard dissimilarity equals one. If the intersection of two sets is empty (i.e., none of the same terms are used in the two sets), then the Jaccard dissimilarity equals zero. The thresholding parameter may be set between zero and one (step 710). A thresholding parameter that is closer to zero allows greater tolerance for differences between the two relevant symbol lists, and retraining occurs less frequently. A thresholding parameter that is closer to one allows less tolerance for differences between the two lists, and retraining occurs more frequently.

Process 700 includes comparing the calculated dissimilarity to the threshold (714). If the calculated dissimilarity is greater than the threshold, then retraining may be initiated (716). The need for retraining may be reported to a user interface generated by GUI services 110. In some embodiments, retraining starts automatically (without a manual input). In other embodiments, the input of a BAS operator is required to start retraining. When the calculated dissimilarity is less than the threshold, the relevant symbol list from the first set may be continued to be used in the classification of points (718).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system of a building comprising one or more storage devices having instructions stored thereon that, when executed by one or more processors, cause the one or more processors to:
   receive a plurality of strings representing a plurality of points, spaces, or pieces of equipment of the building;
   receive a list of a plurality of semantic type descriptions for the plurality of points, spaces, or pieces of equipment computable by a plurality of software applications;
   label the plurality of points, spaces, or pieces of equipment with the plurality of semantic type descriptions by analyzing the plurality of strings with a translation technique;
   determine a plurality of relationships between a plurality of labels selected for the plurality of points, spaces, or pieces of equipment; and
   generate a file computable by the plurality of software applications, the file comprising the plurality of labels and the plurality of relationships between the plurality of labels.

2. The building system of claim 1, wherein:
   the plurality of strings are defined in a first syntax;
   the plurality of labels assigned for the plurality of points, spaces, or pieces of equipment are defined in a second syntax; and
   the translation technique is trained to translate between the first syntax and the second syntax.

3. The building system of claim 1, wherein the plurality of strings are in a first syntax;
   wherein the instructions cause the one or more processors to:
   generate a user interface comprising indications of the plurality of points, spaces, or pieces of equipment of the building in a second syntax comprising the plurality of semantic type descriptions;
   cause a user device to display the user interface; and
   receive, via the user device, an indication of one or more of the plurality of relationships from the user device based on one or more user interactions with the user interface.

4. The building system of claim 1, wherein the instructions cause the one or more processors to:
   assign at least one type of the plurality of semantic type descriptions to each of the plurality of strings.

5. The building system of claim 1, wherein the building system further comprises a plurality of pieces of building equipment of the building, wherein the plurality of pieces of building equipment are configured to monitor and control one or more building spaces of the building using the plurality of labels.

6. The building system of claim 1, wherein the plurality of strings form text descriptions of attributes of the plurality of points, spaces, or pieces of equipment of the building.

7. The building system of claim 1, wherein the instructions cause the one or more processors to:
generate a set of probability values for a string of the plurality of strings, each probability value of the set of probability values corresponding to a different label of the plurality of semantic type descriptions and indicating a probability that the string belongs to a corresponding label based on one or more characters of the string;
wherein the one or more characters of the string are an input to the translation technique and the set of probability values are an output of the translation technique.

8. The building system of claim 1, wherein the translation technique is at least one of a Bayes technique or a latent semantic indexing technique.

9. A method, comprising:
receiving, by one or more processing circuits, a plurality of strings representing a plurality of points, spaces, or pieces of equipment of a building;
receiving, by the one or more processing circuits, a list of a plurality of semantic type descriptions for the plurality of points, spaces, or pieces of equipment computable by a plurality of software applications;
labeling, by the one or more processing circuits, the plurality of points, spaces, or pieces of equipment with the plurality of semantic type descriptions by analyzing the plurality of strings with a translation technique;
determining, by the one or more processing circuits, a plurality of relationships between a plurality of labels selected for the plurality of points, spaces, or pieces of equipment; and
generating, by the one or more processing circuits, a file computable by the plurality of software applications, the file comprising the plurality of labels and the plurality of relationships between the plurality of labels.

10. The method of claim 9, wherein:
the plurality of strings are defined in a first syntax;
the plurality of labels assigned for the plurality of points, spaces, or pieces of equipment are defined in a second syntax; and
the translation technique is trained to translate between the first syntax and the second syntax.

11. The method of claim 9, wherein the plurality of strings are in a first syntax;
wherein the method comprises:
generating, by the one or more processing circuits, a user interface comprising indications of the plurality of points, spaces, or pieces of equipment of the building in a second syntax comprising the plurality of semantic type descriptions;
causing, by the one or more processing circuits, a user device to display the user interface; and
receiving, by the one or more processing circuits an indication of one or more of the plurality of relationships from the user device based on one or more user interactions with the user interface.

12. The method of claim 9, comprising:
assigning, by the one or more processing circuits, at least one type of the plurality of semantic type descriptions to each of the plurality of strings.

13. The method of claim 9, comprising:
monitoring or controlling, by the one or more processing circuits, one or more building spaces of the building using the plurality of labels.

14. The method of claim 9, wherein the plurality of strings form text descriptions of attributes of the plurality of points, spaces, or pieces of equipment of the building.

15. The method of claim 9, comprising:
generating, by the one or more processing circuits, a set of probability values for a string of the plurality of strings, each probability value of the set of probability values corresponding to a different label of the plurality of semantic type descriptions and indicating a probability that the string belongs to a corresponding label based on one or more characters of the string;
wherein the one or more characters of the string are an input to the translation technique and the set of probability values are an output of the translation technique.

16. The method of claim 9, wherein the translation technique is at least one of a Bayes technique or a latent semantic indexing technique.

17. One or more non-transitory storage media having instructions stored thereon that, when executed by one or more processors, cause the one or more processors to:
receive a plurality of strings representing a plurality of points, spaces, or pieces of equipment of a building;
receive a list of a plurality of semantic type descriptions for the plurality of points, spaces, or pieces of equipment computable by a plurality of software applications;
label the plurality of points, spaces, or pieces of equipment with the plurality of semantic type descriptions by analyzing the plurality of strings with a translation technique;
determine a plurality of relationships between a plurality of labels selected for the plurality of points, spaces, or pieces of equipment; and
generate a file computable by the plurality of software applications, the file comprising the plurality of labels and the plurality of relationships between the plurality of labels.

18. The one or more non-transitory storage media of claim 17, wherein:
the plurality of strings are defined in a first syntax;
the plurality of labels assigned for the plurality of points, spaces, or pieces of equipment are defined in a second syntax; and
the translation technique is trained to translate between the first syntax and the second syntax.

19. The one or more non-transitory storage media of claim 17, wherein the plurality of strings are in a first syntax;
wherein the instructions cause the one or more processors to:
generate a user interface comprising indications of the plurality of points, spaces, or pieces of equipment of the building in a second syntax comprising the plurality of semantic type descriptions;
cause a user device to display the user interface; and
receive, via the user device, an indication of one or more of the plurality of relationships from the user device based on one or more user interactions with the user interface.

20. The one or more non-transitory storage media of claim 17, wherein the instructions cause the one or more processors to:
assign at least one type of the plurality of semantic type descriptions to each of the plurality of strings.

\* \* \* \* \*